(12) United States Patent
Hess et al.

(10) Patent No.: US 11,971,475 B2
(45) Date of Patent: *Apr. 30, 2024

(54) 2D MIMO VEHICULAR RADAR SENSING SYSTEM

(71) Applicant: MAGNA ELECTRONICS INC., Auburn Hills, MI (US)

(72) Inventors: Holger Hess, Hösbach (DE); Joern Ihlenburg, Berlin (DE)

(73) Assignee: Magna Electronics Inc., Auburn Hills, MI (US)

(*) Notice: Subject to any disclaimer, the term of this patent is extended or adjusted under 35 U.S.C. 154(b) by 81 days.

This patent is subject to a terminal disclaimer.

(21) Appl. No.: 17/935,188

(22) Filed: Sep. 26, 2022

(65) Prior Publication Data

US 2023/0014401 A1    Jan. 19, 2023

Related U.S. Application Data

(63) Continuation of application No. 16/315,794, filed as application No. PCT/IB2017/054120 on Jul. 7, 2017, now Pat. No. 11,454,719.

(Continued)

(51) Int. Cl.
*G01S 13/931* (2020.01)
*G01S 7/04* (2006.01)
*H04B 7/0413* (2017.01)

(52) U.S. Cl.
CPC .............. *G01S 13/931* (2013.01); *G01S 7/04* (2013.01); *H04B 7/0413* (2013.01);
(Continued)

(58) Field of Classification Search
None
See application file for complete search history.

(56) References Cited

U.S. PATENT DOCUMENTS

| 5,949,331 A | 9/1999 | Schofield et al. |
| 6,587,186 B2 | 7/2003 | Bamji et al. |

(Continued)

FOREIGN PATENT DOCUMENTS

| CN | 103106704 A | 5/2013 |
| CN | 105676219 A | 6/2016 |

(Continued)

OTHER PUBLICATIONS

International Search Report and Written Opinion dated Nov. 22, 2017 for corresponding PCT Application No. PCT/IB2017/054120.

(Continued)

*Primary Examiner* — Marcus E Windrich
(74) *Attorney, Agent, or Firm* — HONIGMAN LLP

(57) ABSTRACT

A vehicular radar sensing system includes at least one radar sensor having a plurality of transmitting antennas and a plurality of receiving antennas. Individual transmitting antennas are arranged in multiple rows, and individual receiving antennas are arranged in multiple columns. The multiple rows of transmitting antennas include first and second rows of transmitting antennas, each row having at least four transmitting antennas. Each column of the multiple columns of receiving antennas comprises at least four receiving antennas. The multiple columns of receiving antennas are disposed between the first row of transmitting antennas and the second row of transmitting antennas. The vehicular radar sensing system applies two dimensional multiple input multiple output processing to outputs of the receiving antennas. The vehicular radar sensing system, responsive to processing of outputs of the receiving antennas, detects objects present in a field of sensing of the at least one radar sensor.

23 Claims, 3 Drawing Sheets

Related U.S. Application Data

(60) Provisional application No. 62/359,913, filed on Jul. 8, 2016.

(52) U.S. Cl.
CPC ............. *G01S 2013/9314* (2013.01); *G01S 2013/9315* (2020.01); *G01S 2013/93185* (2020.01)

(56) References Cited

U.S. PATENT DOCUMENTS

| | | | |
|---|---|---|---|
| 6,674,895 B2 | 1/2004 | Rafii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,710,770 B2 | 3/2004 | Tomasi et al. | |
| 6,825,455 B1 | 11/2004 | Schwarte | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,053,357 B2 | 5/2006 | Schwarte | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,249,860 B2 | 7/2007 | Kulas et al. | |
| 7,283,213 B2 | 10/2007 | O'Connor et al. | |
| 7,308,341 B2 | 12/2007 | Schofield et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,522,095 B1 | 4/2009 | Wasiewicz et al. | |
| 8,027,029 B2 | 9/2011 | Lu et al. | |
| 8,749,429 B2* | 6/2014 | Heilmann | G01S 7/4004 342/70 |
| 9,036,026 B2 | 5/2015 | Dellantoni et al. | |
| 9,146,898 B2 | 9/2015 | Ihlenburg et al. | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,753,121 B1 | 9/2017 | Davis et al. | |
| 11,454,719 B2 | 9/2022 | Hess et al. | |
| 2004/0032366 A1 | 2/2004 | Langenberg | |
| 2008/0100510 A1* | 5/2008 | Bonthron | G01S 13/89 342/373 |
| 2008/0158056 A1 | 7/2008 | Shima | |
| 2009/0251355 A1* | 10/2009 | Nanami | G01S 13/867 342/70 |
| 2010/0001897 A1 | 1/2010 | Lyman | |
| 2010/0245066 A1 | 9/2010 | Sarioglu et al. | |
| 2011/0074621 A1* | 3/2011 | Wintermantel | H01Q 1/3233 342/70 |
| 2012/0062743 A1 | 3/2012 | Lynam et al. | |
| 2012/0162427 A1 | 6/2012 | Lynam | |
| 2012/0218412 A1 | 8/2012 | Dellantoni et al. | |
| 2012/0256795 A1* | 10/2012 | Tajima | H01Q 9/0407 343/700 MS |
| 2012/0280862 A1* | 11/2012 | Moffatt | G01S 13/765 342/385 |
| 2013/0162475 A1 | 6/2013 | Blech et al. | |
| 2013/0215271 A1 | 8/2013 | Lu | |
| 2013/0222592 A1 | 8/2013 | Gieseke | |
| 2013/0250114 A1 | 9/2013 | Lu | |
| 2014/0043473 A1 | 2/2014 | Gupta et al. | |
| 2014/0218529 A1 | 8/2014 | Mahmoud et al. | |
| 2014/0333729 A1 | 11/2014 | Pflug | |
| 2014/0340510 A1 | 11/2014 | Ihlenburg et al. | |
| 2015/0022664 A1 | 1/2015 | Pflug et al. | |
| 2015/0048965 A1* | 2/2015 | Cornic | G01S 3/46 342/27 |
| 2015/0124096 A1 | 5/2015 | Koravadi | |
| 2015/0158499 A1 | 6/2015 | Koravadi | |
| 2015/0204972 A1* | 7/2015 | Kuehnle | G01S 13/42 342/156 |
| 2015/0251599 A1 | 9/2015 | Koravadi | |
| 2015/0352953 A1 | 12/2015 | Koravadi | |
| 2016/0033632 A1* | 2/2016 | Searcy | G01S 13/424 342/153 |
| 2016/0036917 A1 | 2/2016 | Koravadi et al. | |
| 2016/0131752 A1 | 5/2016 | Jansen et al. | |
| 2016/0204840 A1* | 7/2016 | Liu | H04B 7/0413 375/267 |
| 2016/0210853 A1 | 7/2016 | Koravadi | |
| 2016/0285172 A1* | 9/2016 | Kishigami | G01S 7/0234 |
| 2017/0129489 A1 | 5/2017 | Pawlicki et al. | |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0307744 A1* | 10/2017 | Loesch | H01Q 21/296 |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0059236 A1 | 3/2018 | Wodrich et al. | |
| 2018/0065623 A1 | 3/2018 | Wodrich et al. | |
| 2018/0067194 A1 | 3/2018 | Wodrich et al. | |
| 2018/0231635 A1 | 8/2018 | Woehlte | |
| 2018/0231657 A1 | 8/2018 | Woehlte | |
| 2018/0299533 A1 | 10/2018 | Pliefke et al. | |
| 2019/0056478 A1* | 2/2019 | Millar | H04B 1/69 |
| 2019/0072666 A1 | 3/2019 | Duque Biarge et al. | |
| 2019/0072667 A1 | 3/2019 | Duque Biarge et al. | |
| 2019/0072668 A1 | 3/2019 | Duque Biarge et al. | |
| 2019/0072669 A1 | 3/2019 | Duque Biarge et al. | |
| 2019/0217775 A1 | 7/2019 | May et al. | |

FOREIGN PATENT DOCUMENTS

| | | |
|---|---|---|
| DE | 102012223696 A1 | 6/2014 |
| DE | 102014219113 A1 | 3/2016 |
| WO | 2011090484 A1 | 7/2011 |
| WO | 2016002221 A1 | 1/2016 |
| WO | 2018007995 A1 | 1/2018 |

OTHER PUBLICATIONS

Extended European Search Report dated Feb. 5, 2020 from corresponding EP Application No. 17823748.3.

* cited by examiner

Antenna Array:

Virtual two-dimensional antenna aperture when 2D MIMO is applied:

2D MIMO VEHICULAR RADAR SENSING SYSTEM

CROSS REFERENCE TO RELATED APPLICATIONS

The present application is a continuation of U.S. patent application Ser. No. 16/315,794, filed Jul. 7, 2017, now U.S. Pat. No. 11,454,719, which is a 371 national phase filing of PCT Application No. PCT/IB2017/054120, filed Jul. 7, 2017, which claims the filing benefits of U.S. provisional application Ser. No. 62/359,913, filed Jul. 8, 2016, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and U.S. publication No. US-2010-0245066 and International Publication No. WO 2011/090484, which are hereby incorporated herein by reference in their entireties.

SUMMARY OF THE INVENTION

The present invention provides a driver assistance system or sensing system for a vehicle that utilizes one or more ranging sensors (such as radar sensors or the like) disposed at the vehicle to sense respective regions exterior of the vehicle, with each of the sensors or sensor units comprising a plurality of transmitters and receivers disposed at the vehicle. In a radar sensor of the present invention, a plurality of transmitting antennas and a plurality of receiving antennas are arranged as a two dimensional array of antennas. Outputs of the two dimensional array of antennas are communicated to a control, and the control applies two dimensional multiple input multiple output (MIMO) processing to outputs of the two dimensional array of antennas. Responsive to such processing, the control determines the presence of one or more objects exterior the vehicle and within the field of sensing of the array.

According to an aspect of the present invention, a radar sensing system for a vehicle includes a radar sensor having a plurality of transmitting antennas and a plurality of receiving antennas. The transmitting antennas and the receiving antennas are arranged in multiple rows and columns of transmitting antennas and multiple rows and columns of receiving antennas. A control controls radar transmission by the transmitting antennas and receives outputs from the receiving antennas. The control applies two dimensional multiple input multiple output processing to outputs of the receiving antennas. With two dimensional multiple input multiple output processing applied to outputs of the receiving antennas, the transmitting antennas and the receiving antennas achieve an enhanced two dimensional virtual aperture. The plurality of transmitting antennas may be arranged in three rows, each row comprising four transmitting antennas, while the plurality of receiving antennas may be arranged in four columns, each column comprising at least four receiving antennas, with the columns of receiving antennas disposed between spaced apart rows of transmitting antennas, whereby the rows of transmitting antennas and the columns of receiving antennas function as 192 virtual receivers.

These and other objects, advantages, purposes and features of the present invention will become apparent upon review of the following specification in conjunction with the drawings.

DESCRIPTION OF THE PREFERRED EMBODIMENTS

Figure 1:
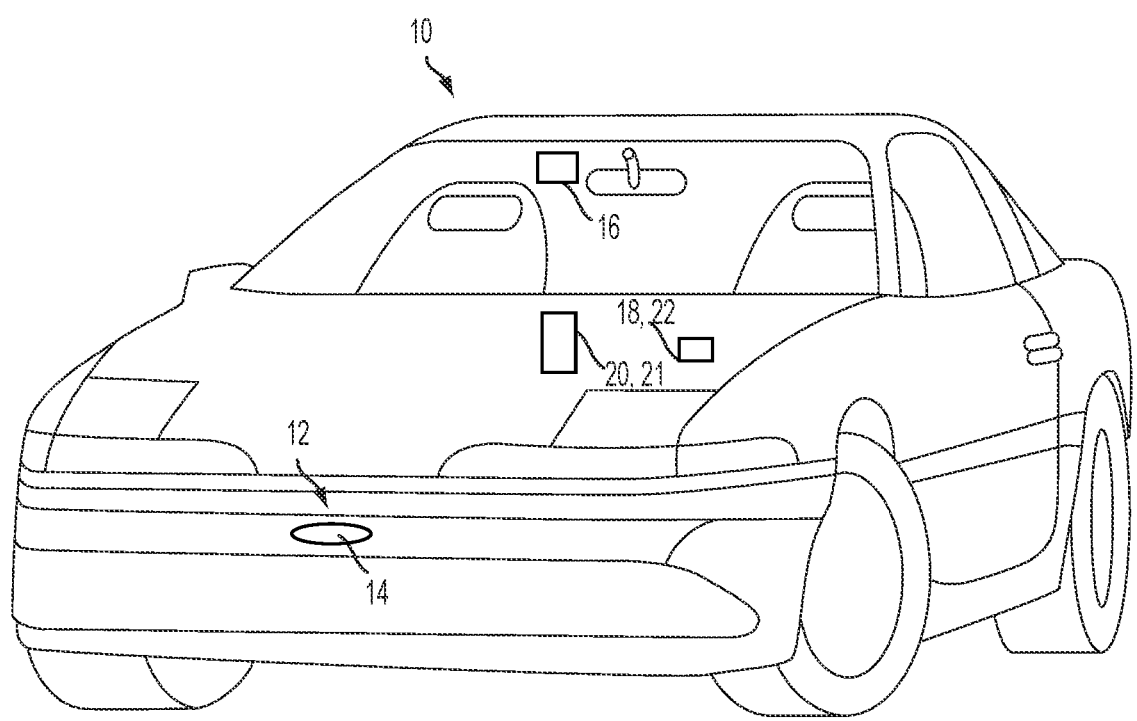
FIG. 1 is a perspective view of a vehicle with a sensing system that incorporates a radar sensor in accordance with the present invention.

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system includes a processor that is operable to receive sensing data from multiple sensors and to provide an output to a control 18 that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Referring now to the drawings and the illustrative embodiments depicted therein, a vehicle 10 includes a driver assistance system or sensing system 12 that includes at least one radar sensor unit, such as a forward facing radar sensor unit 14 (and the system may optionally include multiple exterior facing radar sensors and/or other sensors, such as cameras or other sensors or the like, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Automotive radars typically consist of multiple transmit and receive antennas in various formations, called antenna arrays. The total size (aperture) of such an antenna array formation defines the angular accuracy and angular discrimination capabilities of the radar sensing system. For radar systems, the term "resolution" is often used to describe the capability to discriminate two objects which are close to each other.

Figures 2, 3:
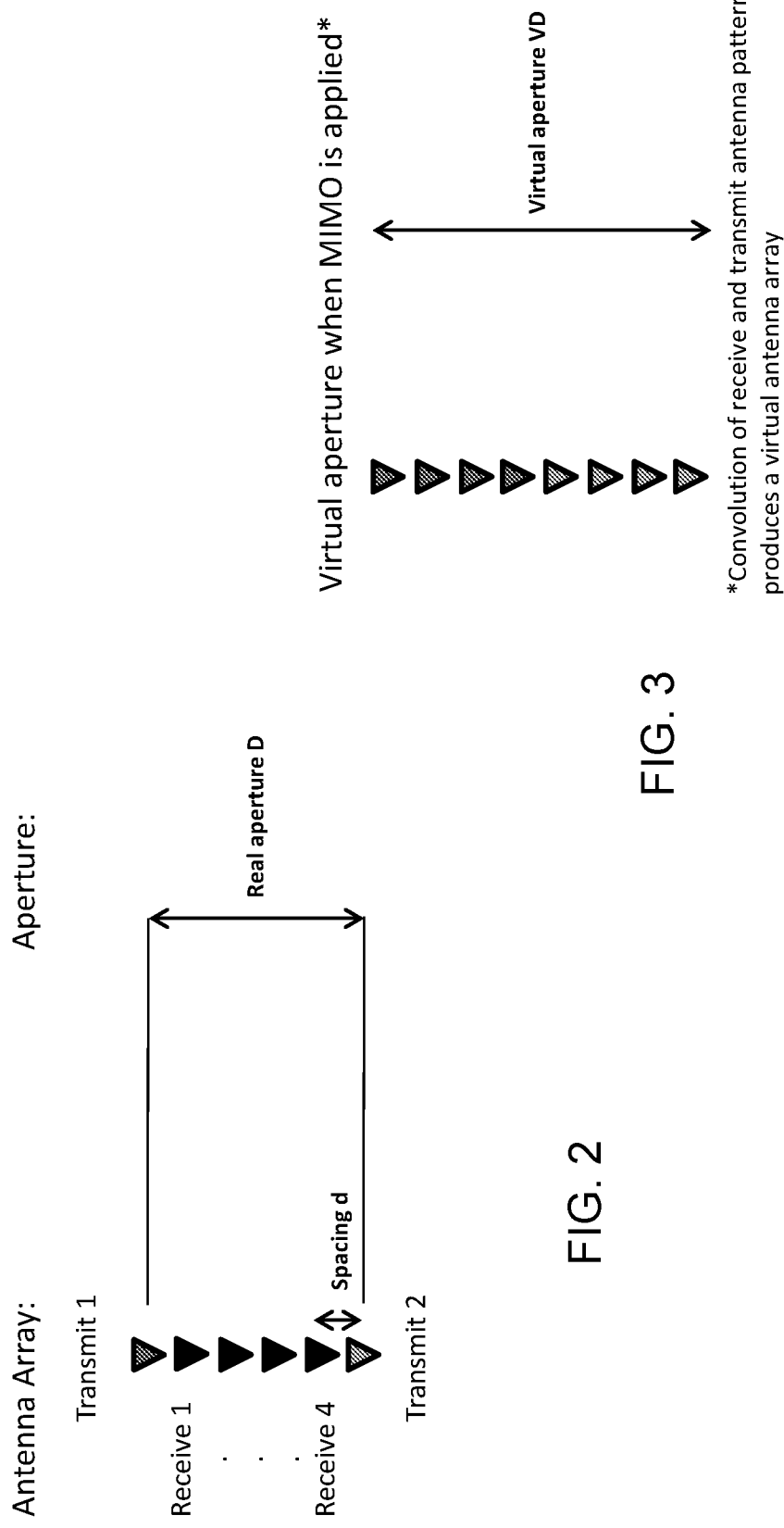
FIG. 2 is a diagram showing an antenna formation using two transmitting antenna and four receiving antenna.
FIG. 3 is a diagram showing the antennas of FIG. 2, with a virtual aperture when MIMO is applied.

Some automotive radars use MIMO (Multiple Input Multiple Output) techniques to create an effective virtual antenna aperture, which is significantly larger than the real antenna aperture, and delivers much better angular resolution than conventional radars, such as, for example, conventional scanning radars. MIMO techniques are today just used in one dimension (typically horizontal). For example, a one dimensional array of transmitting antennas (such as two transmitting antennas) and receiving antennas (such as four receiving antennas) are linearly arranged in a single row (or column) and their real aperture is shown in FIG. 2. When MIMO techniques are applied, the virtual aperture (FIG. 3) achieved is greater than the real aperture.

In order to achieve angular accuracy and resolution in horizontal as well as in vertical, a two dimensional antenna array is used. A two dimensional radar is achieved by two scans, separately (time-multiplexed) in horizontal and vertical. A two dimensional radar can also be achieved by using MIMO when used separately for horizontal and vertical scan (also time-multiplexed).

Multi-dimensional MIMO techniques are used in communication systems today. When these techniques are applied to an automotive radar system, very accurate horizontal and vertical accuracy and resolution can be achieved at once (not time-multiplexed). Therefore, two dimensional (2D) MIMO techniques are applied on a two dimensional antenna array.

Figures 4, 5:
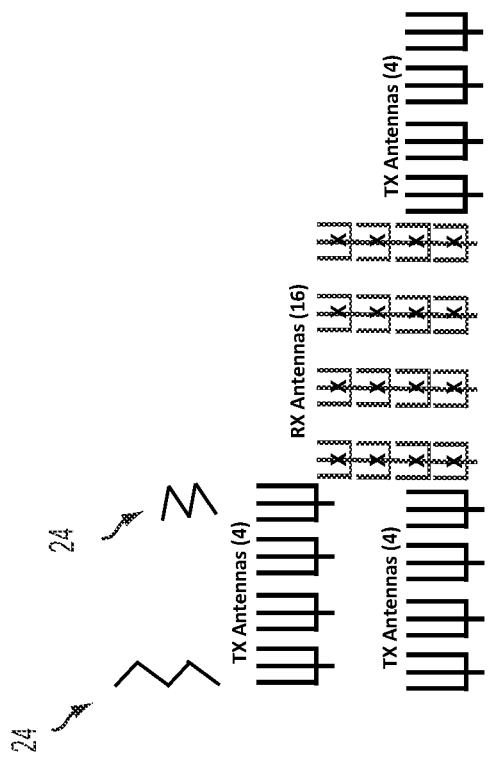
FIG. 4 is a diagram of an antenna array with multiple transmitting antenna and multiple receiving antenna in accordance with the present invention.
FIG. 5 is a diagram showing the virtual two-dimensional antenna aperture when 2D MIMO is applied with the antenna array of FIG. 4.

In the illustrated embodiment of the radar sensing system of the present invention, a two dimensional array of transmitting (Tx) antennas and receiving (Rx) antennas includes 12 transmitting (Tx) antennas and 16 receiving (Rx) antennas (FIG. 4) (which are configured for 2D MIMO processing and 192 virtual receivers). As shown in FIG. 4, the system may include three rows of four transmitting antennas and four columns of four receiving antennas arranged or configured to provide the desired or appropriate virtual aperture. When two dimensional MIMO techniques are applied to the array of antennas of FIG. 4, a two dimensional virtual antenna aperture is achieved (FIG. 5) that provides enhanced accuracy and resolution in both horizontal and vertical directions.

Thus, the two dimensional (2D) array of Tx antennas and Rx antennas is created on and occupies a two dimensional surface, such as a surface of a two dimensional antenna board or substrate or the like, with all Tx antennas and Rx antennas not in a single row or single column. Although shown and described as having three rows of four Tx antennas and four columns of four Rx antennas, other two dimensional arrangements of Tx and Rx antennas may be used, while remaining within the spirit and scope of the present invention. For example, the two dimensional arrangement of Tx and Rx antennas preferably includes at least four Tx antennas and six Rx antennas (providing at least twenty-four virtual receivers), more preferably at least eight Tx antennas and ten Rx antennas (providing at least eighty virtual receivers), and more preferably at least twelve Tx antennas and sixteen Rx antennas (providing at least 192 virtual receivers).

In a MIMO system, each transmitting antenna radiates an arbitrary waveform 24 (FIG. 4) independently of the other transmitting antennas, and each receiving antenna can receive these signals. Due to the different wave forms, the echo signals can be designated as coming from the respective transmitting antenna.

Thus, the system of the present invention provides enhanced radar sensing and processing, such as for detecting objects present in the field of sensing of the radar sensing system. For example, the control may apply two dimensional multiple input multiple output processing to outputs of the two dimensional array of antennas to detect objects present in the field of sensing of the two dimensional array of antennas, such as for a driving assistance system of the vehicle. For example, the driving assistance system may comprise an autonomous driving system, a semi-autonomous driving system, an automated parking system, a blind spot detection system, a cross traffic alert system, a lane change and merge aid system, an automatic emergency braking system, a pedestrian detection system, turn assist, and/or an intersection collision mitigation system. Optionally, the driving assistance system may also utilize image data captured by one or more exterior viewing cameras of the vehicle, and optionally the captured image data may be fused with sensed radar data to enhance detection of objects exterior of the vehicle. Optionally, the radar sensing system may provide an output to a control that, responsive to the output being indicative of detection of an object of interest exterior the vehicle (such as an object in the path of travel of the vehicle), generates an alert 21 (such as a visual or audible or haptic alert to the driver or passenger of the vehicle) or controls an accessory 22 or system of the vehicle (such as a steering system or braking system of the vehicle), or highlights or overlays an alert on a display screen 20 (that may be displaying video images captured by a single rearward viewing camera 16 or multiple exterior viewing cameras 16 providing forward, side or 360 degree surround views of the area surrounding the vehicle during a reversing or low speed maneuver of the vehicle) to highlight the detected object in the displayed images to enhance the awareness of the driver as to the presence of the object.

The sensing system of the present invention may utilize aspects of the systems described in U.S. Pat. Nos. 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066 and/or U.S. patent application Ser. No. 15/619,627, filed Jun. 12, 2017, Ser. No. 15/584,265, filed May 2, 2017, Ser. No. 15/467,247, filed Mar. 23, 2017, Ser. No. 15/446,220, filed Mar. 1, 2017, Ser. No. 15/420,238, filed Jan. 31, 2017, Ser. No. 15/467,247, filed Mar. 23, 2017, Ser. No. 15/446,220, filed Mar. 1, 2017, and/or Ser. No. 15/420,238, filed Jan. 31, 2017, and/or U.S. provisional applications, Ser. No. 62/375,161, filed Aug. 15, 2016, and/or Ser. No. 62/361,586, filed Jul. 13, 2016, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663;

5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:
at least one radar sensor disposed at a vehicle equipped with the vehicular radar sensing system, the at least one radar sensor having a plurality of transmitting antennas and a plurality of receiving antennas;
wherein individual transmitting antennas of the plurality of transmitting antennas are arranged in multiple rows of transmitting antennas, and wherein individual receiving antennas of the plurality of receiving antennas are arranged in multiple columns of receiving antennas;
wherein the multiple rows of transmitting antennas comprises at least a first row of transmitting antennas comprising at least four transmitting antennas and a second row of transmitting antennas comprising at least four transmitting antennas;
wherein each column of the multiple columns of receiving antennas comprises at least four receiving antennas;
wherein the multiple columns of receiving antennas are disposed between the first row of transmitting antennas and the second row of transmitting antennas;
wherein each transmitting antenna radiates a waveform independently of each other transmitting antenna;
an electronic control unit (ECU) comprising a processor;
wherein the vehicular radar sensing system controls radar transmission by the transmitting antennas and receives outputs from the receiving antennas;
wherein the vehicular radar sensing system applies two dimensional multiple input multiple output processing to outputs of the receiving antennas;
wherein the vehicular radar sensing system, responsive to processing at the ECU of outputs of the receiving antennas, detects objects present in a field of sensing of the at least one radar sensor; and
wherein the vehicular radar sensing system provides detection for a driving assistance system of the vehicle, and wherein the driving assistance system comprises at least one selected from the group consisting of (i) an automatic emergency braking system, (ii) a pedestrian detection system and (iii) a collision mitigation system.

2. The vehicular radar sensing system of claim 1, wherein each receiving antenna receives signals reflected off objects in the field of sensing of the vehicular radar sensing system.

3. The vehicular radar sensing system of claim 2, wherein, based at least in part on different transmitted waveforms, the reflected signals can be designated as originating from a particular transmitting antenna.

4. The vehicular radar sensing system of claim 1, wherein the vehicular radar sensing system, responsive to detection of an object present in the field of sensing of the at least one radar sensor, generates an alert.

5. The vehicular radar sensing system of claim 1, wherein the vehicular radar sensing system, responsive to detection of an object present in the field of sensing of the at least one radar sensor, controls an accessory of the vehicle.

6. The vehicular radar sensing system of claim 1, wherein the vehicular radar sensing system, responsive to detection of an object present in the field of sensing of the at least one radar sensor, highlights a portion of images displayed on a display screen of the vehicle that is displaying video images captured by one or more exterior viewing cameras of the vehicle.

7. The vehicular radar sensing system of claim 1, wherein, with two dimensional multiple input multiple output processing applied to outputs of the receiving antennas, the transmitting antennas and the receiving antennas achieve an enhanced two dimensional virtual aperture.

8. The vehicular radar sensing system of claim 1, wherein the multiple rows of transmitting antennas comprises a third row of transmitting antennas comprising at least four transmitting antennas.

9. The vehicular radar sensing system of claim 1, wherein the multiple columns of receiving antennas comprises at least four columns of transmitting antennas.

10. The vehicular radar sensing system of claim 1, wherein the driving assistance system comprises an autonomous driving system.

11. The vehicular radar sensing system of claim 1, wherein the driving assistance system comprises a semi-autonomous driving system.

12. The vehicular radar sensing system of claim 1, wherein the driving assistance system also utilizes image data captured by one or more exterior viewing cameras of the vehicle.

13. The vehicular radar sensing system of claim 12, wherein image data captured by the one or more exterior viewing cameras is fused with radar data captured by the at least one radar sensor to enhance detection of objects exterior of the vehicle.

14. The vehicular radar sensing system of claim 1, wherein the at least one radar sensor comprises multiple exterior sensing radar sensors disposed at the vehicle.

15. The vehicular radar sensing system of claim 1, wherein outputs of the receiving antennas are provided from the at least one radar sensor to the ECU via a network bus of the vehicle.

16. A vehicular radar sensing system, the vehicular radar sensing system comprising:
at least one radar sensor disposed at a vehicle equipped with the vehicular radar sensing system, the at least one radar sensor having a plurality of transmitting antennas and a plurality of receiving antennas;
wherein individual transmitting antennas of the plurality of transmitting antennas are arranged in multiple rows of transmitting antennas, and wherein individual receiving antennas of the plurality of receiving antennas are arranged in multiple columns of receiving antennas;

wherein the multiple rows of transmitting antennas comprises at least a first row of transmitting antennas comprising at least four transmitting antennas, a second row of transmitting antennas comprising at least four transmitting antennas and a third row of transmitting antennas comprising at least four transmitting antennas;

wherein the multiple columns of receiving antennas comprises at least four columns of transmitting antennas, and wherein each column of the multiple columns of receiving antennas comprises at least four receiving antennas;

wherein the multiple columns of receiving antennas are disposed between the first row of transmitting antennas and the second row of transmitting antennas;

wherein the multiple rows of transmitting antennas and the multiple columns of receiving antennas function as at least 192 virtual receivers;

wherein each transmitting antenna radiates a waveform independently of each other transmitting antenna;

an electronic control unit (ECU) comprising a processor;

wherein the vehicular radar sensing system controls radar transmission by the transmitting antennas and receives outputs from the receiving antennas;

wherein the vehicular radar sensing system applies two dimensional multiple input multiple output processing to outputs of the receiving antennas;

wherein the vehicular radar sensing system, responsive to processing at the ECU of outputs of the receiving antennas, detects objects present in a field of sensing of the at least one radar sensor; and wherein the vehicular radar sensing system provides detection for a driving assistance system of the vehicle, and wherein the driving assistance system comprises at least one selected from the group consisting of (i) an automatic emergency braking system, (ii) a pedestrian detection system and (iii) a collision mitigation system.

17. The vehicular radar sensing system of claim 16, wherein each receiving antenna receives signals reflected off objects in the field of sensing of the vehicular radar sensing system.

18. The vehicular radar sensing system of claim 17, wherein, based at least in part on different transmitted waveforms, the reflected signals can be designated as originating from a particular transmitting antenna.

19. The vehicular radar sensing system of claim 16, wherein, with two dimensional multiple input multiple output processing applied to outputs of the receiving antennas, the transmitting antennas and the receiving antennas achieve an enhanced two dimensional virtual aperture.

20. The vehicular radar sensing system of claim 16, wherein the driving assistance system also utilizes image data captured by one or more exterior viewing cameras of the vehicle, and wherein image data captured by the one or more exterior viewing cameras is fused with radar data captured by the at least one radar sensor to enhance detection of objects exterior of the vehicle.

21. A vehicular radar sensing system, the vehicular radar sensing system comprising:

at least one radar sensor disposed at a vehicle equipped with the vehicular radar sensing system, the at least one radar sensor having a plurality of transmitting antennas and a plurality of receiving antennas;

wherein individual transmitting antennas of the plurality of transmitting antennas are arranged in multiple rows of transmitting antennas, and wherein individual receiving antennas of the plurality of receiving antennas are arranged in multiple columns of receiving antennas;

wherein the multiple rows of transmitting antennas comprises at least a first row of transmitting antennas comprising at least four transmitting antennas and a second row of transmitting antennas comprising at least four transmitting antennas;

wherein each column of the multiple columns of receiving antennas comprises at least four receiving antennas;

wherein the multiple columns of receiving antennas are disposed between the first row of transmitting antennas and the second row of transmitting antennas;

wherein each transmitting antenna radiates a waveform independently of each other transmitting antenna;

an electronic control unit (ECU) comprising a processor;

wherein the vehicular radar sensing system controls radar transmission by the transmitting antennas and receives outputs from the receiving antennas;

wherein outputs of the receiving antennas are provided from the at least one radar sensor to the ECU via a network bus of the vehicle;

wherein the vehicular radar sensing system applies two dimensional multiple input multiple output processing to outputs of the receiving antennas;

wherein the vehicular radar sensing system, responsive to processing at the ECU of outputs of the receiving antennas, detects objects present in a field of sensing of the at least one radar sensor;

wherein the vehicular radar sensing system provides detection for a driving assistance system of the vehicle, and wherein the driving assistance system comprises at least one selected from the group consisting of (i) an automatic emergency braking system, (ii) a pedestrian detection system and (iii) a collision mitigation system; and wherein the driving assistance system also utilizes image data captured by one or more exterior viewing cameras of the vehicle, and wherein image data captured by the one or more exterior viewing cameras is fused with radar data captured by the at least one radar sensor to enhance detection of objects exterior of the vehicle.

22. The vehicular radar sensing system of claim 21, wherein each receiving antenna receives signals reflected off objects in the field of sensing of the vehicular radar sensing system.

23. The vehicular radar sensing system of claim 22, wherein, based at least in part on different transmitted waveforms, the reflected signals can be designated as originating from a particular transmitting antenna.

* * * * *